United States Patent
Kashima et al.

(10) Patent No.: US 8,599,334 B2
(45) Date of Patent: Dec. 3, 2013

(54) POLARIZING PLATE PROTECTION FILM, POLARIZING PLATE, AND LIQUID CRYSTAL DISPLAY DEVICE

(75) Inventors: Keiji Kashima, Tokyo-to (JP); Takashi Kuroda, Tokyo-to (JP); Satoru Hamada, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 785 days.

(21) Appl. No.: 12/698,270

(22) Filed: Feb. 2, 2010

(65) Prior Publication Data

US 2010/0220266 A1  Sep. 2, 2010

(30) Foreign Application Priority Data

Feb. 6, 2009  (JP) ................. 2009-026800
Sep. 30, 2009  (JP) ................. 2009-226749

(51) Int. Cl.
*G02F 1/1335* (2006.01)
(52) U.S. Cl.
USPC ............................................ 349/96; 349/117
(58) Field of Classification Search
USPC ........................ 349/9, 96, 117–121
See application file for complete search history.

(56) References Cited

U.S. PATENT DOCUMENTS 4,915,479 A * 4/1990 Clarke .......................... 349/62
2001/0046006 A1 * 11/2001 Oki et al. ...................... 349/65
2005/0152038 A1   7/2005 Nishida et al.
2006/0214925 A1   9/2006 Taninaka et al.
2007/0287009 A1  12/2007 Okude et al.

FOREIGN PATENT DOCUMENTS

| CN | 1646949 A | 7/2005 |
|----|-----------|--------|
| JP | 2004-205773 A | 7/2004 |
| JP | 2008-250267 A | 10/2008 |
| JP | 2009-014886 A | 1/2009 |
| KR | 1020060132629 A | 12/2006 |
| TW | I379319 B | 12/2012 |

* cited by examiner

*Primary Examiner* — Edward Glick
*Assistant Examiner* — David Chung
(74) *Attorney, Agent, or Firm* — Ladas & Parry LLP

(57) ABSTRACT

A polarizing plate protection film and a polarizing plate which can restrain generation of rainbow-like irregularities and enables to produce an excellent quality liquid crystal display device when a commercially-available film is used as it is under commercially-available conditions or when a film produced by a common film forming method is used. The polarizing plate protection film includes: a transparent substrate; and a refractive index difference-mitigating part formed on the transparent substrate and provided with a low refractive index layer at its most outer layer, in which the low refractive index layer has a refractive index to the light transmitted through the transparent substrate smaller than that of the transparent substrate and bigger than that of the air. An in-plane distribution of the in-plane retardation (Re) of the transparent substrate is 5 nm or more.

10 Claims, 11 Drawing Sheets

POLARIZING PLATE PROTECTION FILM, POLARIZING PLATE, AND LIQUID CRYSTAL DISPLAY DEVICE

BACKGROUND OF THE INVENTION

1. Field of the Invention

The present invention relates to a polarizing plate protection film used for protecting a polarizer of a polarizing plate, a polarizing plate using the polarizing plate protection film, and a liquid crystal display device using the polarizing plate.

2. Description of the Related Art

In recent years, liquid crystal displays have been rapidly spread in place of conventional CRT displays, because of their characteristics such as electric power saving, lightweight and slimness. As shown in FIG. 11, for example, a general liquid crystal display device 100 comprises a backlight-side polarizing plate 102A, a display-side polarizing plate 102B, and a liquid crystal cell 101. In this structure, the polarizing plates 102A and 102B are each so configured that only linearly polarized light having an oscillation surface in a specific oscillation direction can be selectively transmitted, and placed opposite to each other in the crossed-Nicol arrangement so that the respective oscillation directions can be orthogonal to each other. The liquid crystal cell 101 is placed between the polarizing plates 102A and 102B.

Known examples of such liquid crystal display utilize various driving modes depending on the alignment mode of the liquid crystal material in the liquid crystal cell. The majority of currently popular liquid crystal display devices are classified into TN, STN, VA, IPS, and OCB modes. In particular, VA-mode and IPS-mode liquid crystal display devices have become widely spread today.

The polarizing plate used for the liquid crystal display device generally has a technical structure where a polarizer is sandwiched between two polarizing plate protection films. A film made of cellulosic ester exemplified by triacetylcellulose has been conventionally used as the polarizing plate protection film. This is due to advantages of cellulosic ester such as follows: it has a low in-plane retardation (Re) value so that effect to the display quality of the liquid crystal display device is small, and it has appropriate water permeability so that it can dry through the polarizing plate protection film the moisture remained to the polarizer at the time of producing a polarizing plate. Also, the relatively moderate price of cellulosic ester film is also a contributing factor.

As explained, since the cellulosic ester film has properties suitable for the polarizing plate protection film, a polarizing plate protection film made of cellulosic ester film has been generally used as the polarizing plate for a liquid crystal display device.

However, as a member to catalyze the developing technical field of liquid crystal display devices, using of such cellulosic ester film encompass various problems. As particularly big problems, the followings have been noted.

First, since cellulosic ester generally has no melting point, a cellulosic ester film is generally produced by a so-called solution film-forming method in which a solution with cellulosic ester dissolved in an organic solvent is casted on a supporting body, the solvent is dried and then peeled from the resultant. However, large-scale equipments and specialized techniques are required to carry out such solution film-forming method including the solvent drying process and the like. Thus, the producer of the cellulosic ester film is limited to those who possess the specialized techniques and the production of the cellulosic ester film cannot meet the demands of the developing liquid crystal display device technical field. Therefore, continuing to relying on the cellulosic ester film as the polarizing plate protection film has a danger of hindering the development in the liquid crystal display device technical filed, which should be regarded as one of the major industries of Japan without exaggeration.

Further, in generally forming a cellulosic ester film by the solution film-forming method, dichloromethane is used for a main solvent as an organic solvent for the cellulosic ester solution. However, dichloromethane is suspected its risk to the human body. As such, it is not desirable from environmental aspect to continue relying on the cellulosic ester film for years to come because it will increase the consumption and discharge of dichloromethane as the liquid crystal display device technical filed develops.

In view of this, a film substituting the cellulosic ester film is desired today to use as a polarizing plate protection film. Especially from the view point of the above-explained problem casted by the cellulosic ester film, using of a general-purpose film which is easily available in the market or capable of being produced by a simple method is desired as a polarizing plate protection film. Based on such consideration, attempts have been made to utilize a film substituting the cellulosic ester, such as a film made of polyethylene terephthalate (for example, Japanese Patent Application Publication (JP-A) No. 2004-205773).

When using a film having high general-purpose properties, such as one made of polyethylene terephthalate (PET) as a cellulosic ester film-substituting film, there is a problem that a display quality of a liquid crystal display device is impaired. This is caused by a problem that a film made of polyethylene terephthalate or the like having high general-purpose properties generates irregularities having different colors (hereinafter, they are sometimes referred "rainbow-like irregularities", they are especially observed when viewed from an oblique direction) to a liquid crystal display device compare to a case of using a conventional cellulosic ester film.

Thus, in case of using a general-purpose film of polyethylene terephthalate or the like instead of a cellulosic ester film, it is necessary to use a film at least having a low in-plane retardation (Re) value. However, a general-purpose film of polyethylene terephthalate or the like generally has very large in-plane retardation (Re) due to a material or film-forming method and a specialized technology improvement is necessary to reduce the in-plane retardation (Re) value. Thus, the effect of using a general-purpose film instead of a cellulosic ester film becomes eliminated and the usage of such a general-purpose film becomes to have no contribution to the resolution of the facing problem.

SUMMARY OF THE INVENTION

The present invention is achieved in view of the above situation, and a main object thereof is to provide a polarizing plate protection film and a polarizing plate which can restrain generation of rainbow-like irregularities and enable to produce an excellent quality liquid crystal display device when a commercially-available film such as one made of polyethylene terephthalate is used as it is under commercially-available conditions and without being technically-improved separately or when a film produced by a common film forming method is used in the liquid crystal display device.

As a result of vigorous study made by the present inventors, they resolved that the rainbow-like irregularities, generated in the liquid crystal display device when a general-purpose film made of a material such as polyethylene terephthalate is used as a polarizing plate protection film, are caused by the in-plane retardation distribution in the film in-plane. The inventors have found out that the rainbow-like irregularities can be prevented without resolving the in-plane distribution problem and by forming on a film surface a layer which satisfies the predetermined refractive conditions. Thereby, the refractive index difference between the P polarization and S polarization incident from the backlight side to the observer side is reduced even when the general-purpose film is used. Accordingly, they completed the present invention.

To attain the above-mentioned problems, the present invention provides a polarizing plate protection film comprising: a transparent substrate; and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, wherein an in-plane distribution of an in-plane retardation (Re) of the transparent substrate is 5 nm or more.

The polarizing plate protection film of the present invention has a technical structure where the refractive index difference-mitigating part is formed on the transparent substrate, and the refractive index difference-mitigating part is provided with a low refractive index layer at its most outer layer, in which the low refractive index layer has a refractive index to a light transmitted through the transparent substrate smaller than a refractive index of the transparent substrate and bigger than a refractive index of air. Thereby, it becomes possible to prevent the generation of rainbow-like irregularities even when a general-purpose film substituting a cellulosic ester film is used as the transparent substrate. Thus, using the polarizing plate protection film of the present invention, it becomes possible to produce an excellent quality liquid crystal display device even when an in-plane distribution of an in-plane retardation (Re) value of the transparent substrate is large.

In view of the above, it is possible to obtain a polarizing plate protection film which can restrict the generation of rainbow-like irregularities and produce an excellent quality liquid crystal display device even when a general-purpose film is used as the transparent substrate.

The polarizing plate protection film of the present invention preferably has a difference between a reflectance of P wave and a reflectance of S wave at incident angle of 50 degrees of 20% or less. Thereby, it is possible to further restrict the generation of rainbow-like irregularities.

In the present invention, the refractive index difference-mitigating part preferably has a reflectance to the light transmitted through the transparent substrate at Brewster's angle of 6% or more, and a difference between a reflectance of P wave and a reflectance of S wave at incident angle of 50 degrees is preferably 20% or less as the polarizing plate protection film. Further, the refractive index difference-mitigating part is preferably formed only by the low refractive index layer. Thereby, it becomes possible to produce the polarizing plate protection film of the present invention by a simple process while also restrict the generation of rainbow-like irregularities.

In the polarizing plate protection film of the present invention, a value of the in-plane retardation (Re) of the transparent substrate may be 1300 nm or more. Since the polarizing plate protection film of the present invention has the refractive index difference-mitigating part, it is possible to obtain a polarizing plate protection film which can produce an excellent quality liquid crystal display device by restricting the generation of rainbow-like irregularities even when such a transparent substrate is used.

In the present invention, the transparent substrate is preferably made of polyethylene terephthalate (PET). This is because polyethylene terephthalate has high general-purpose properties and is easily available in the market. Further, since the transparent substrate to be used may be the one having a high in-plane retardation (Re) value and in-plane distribution as explained above, it becomes easy to produce the transparent substrate if such a polyethylene terephthalate film is used.

In the present invention, it is possible to obtain a polarizing plate protection film which can produce an excellent quality liquid crystal display device even when a film is made of a material having very high general-purpose properties such as polyethylene terephthalate (PET).

The present invention provides a polarizing plate comprising: a first polarizing plate protection film; a polarizer; and a second polarizing plate protection film, wherein the first polarizing plate protection film further comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more, wherein the polarizer is laminated on the transparent substrate of the first polarizing plate protection film, and wherein the second polarizing plate protection film is laminated on the polarizer.

In the present invention, the above-mentioned polarizing plate protection film, i.e., the film comprising the transparent substrate and the refractive index difference-mitigating part, is used as the first polarizing plate protection film. Thereby, it becomes possible to prevent the generation of rainbow-like irregularities in the liquid crystal display device produced by using the polarizing plate of the present invention, even when a general-purpose film substituting a cellulosic ester film is used as the transparent substrate.

Thereby, using a general-purpose film, it is possible in the present invention to obtain a polarizing plate which can produce an excellent quality liquid crystal display device.

The present invention provides a liquid crystal display device comprising: a liquid crystal cell; a display-side polarizing plate provided to one side of the liquid crystal cell; and a backlight-side polarizing plate provided to the other side of the liquid crystal cell, wherein the display-side polarizing plate further comprises: a first polarizing plate protection film, a polarizer, and a second polarizing plate protection film, wherein the first polarizing plate protection film comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more; the polarizer is laminated on the transparent substrate of the first polarizing plate protection film, and the second polarizing plate protection film is laminated on the polarizer.

In the present invention, the above-mentioned polarizing plate protection film, i.e., the film comprising the transparent substrate and the refractive index difference-mitigating part, is used as the first polarizing plate protection film. Thereby, it becomes possible to prevent the generation of rainbow-like irregularities, even when a general-purpose film substituting a cellulosic ester film is used as the transparent substrate.

Thereby, it is possible to obtain an excellent quality liquid crystal display device using a general-purpose film of the present invention.

The polarizing plate protection film of the present invention can attain effects of restricting the generation of rainbow-like irregularities and of producing an excellent quality liquid crystal display, even when the film is used as it is under commercially-available conditions or a film produced by a common film forming method is used.

DESCRIPTION OF THE PREFERRED EMBODIMENT

As explained, the present invention relates to a polarizing plate protection film, a polarizer, and a liquid crystal display device.

Hereinafter, each of the above will be explained in turn.

A. Polarizing Plate Protection Film

First, polarizing plate protection film of the present invention will be explained. As explained, the polarizing plate protection film of the invention comprises: a transparent substrate; and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, wherein an in-plane distribution of an in-plane retardation (Re) of the transparent substrate is 5 nm or more. The polarizing plate protection film of the invention comprises at least the transparent substrate and the refractive index difference-mitigating part formed on the transparent substrate.

Figure 1:
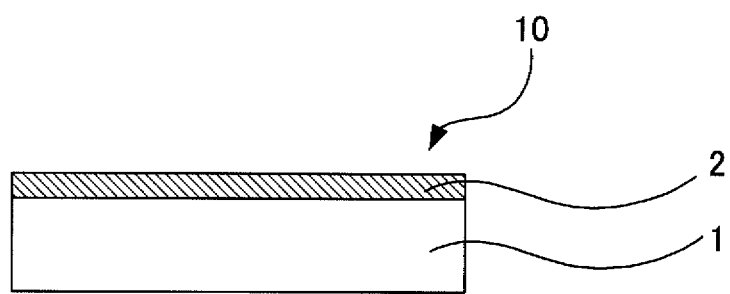
FIG. 1 is a schematic cross-sectional view illustrating one embodiment of the polarizing plate protection film of the present invention.

Such a polarizing plate protection film of the present invention will be explained with reference to the drawings. FIG. 1 is a schematic cross-sectional view illustrating one embodiment of the polarizing plate protection film of the present invention. As shown in FIG. 1, a polarizing plate protection film 10 of the present invention comprises a transparent substrate 1 and a refractive index difference-mitigating part 2 formed on the transparent substrate 1. Here, the refractive index difference-mitigating part 2 is provided with a low refractive index layer at its most outer layer, in which the low refractive index layer has a refractive index to a light transmitted through the transparent substrate smaller than a refractive index of the transparent substrate and bigger than a refractive index of air.

In such an embodiment, the polarizing plate protection film of the present invention has an in-plane distribution of an in-plane retardation (Re) value of the transparent substrate 1 of 5 nm or more.

The polarizing plate protection film of the present invention has a technical structure where the refractive index difference-mitigating part is formed on the transparent substrate, and the refractive index difference-mitigating part is provided with a low refractive index layer at its most outer layer, in which the low refractive index layer has a refractive index to a light transmitted through the transparent substrate smaller than that of the transparent substrate and bigger than that of air. Thereby, it becomes possible to prevent the generation of rainbow-like irregularities even when a general-purpose film substituting a cellulosic ester film is used as the transparent substrate. Therefore, using of the polarizing plate protection film of the present invention makes it possible to produce an excellent quality liquid crystal display device, even when an in-plane distribution of an in-plane retardation (Re) value of the transparent substrate is large.

In view of the above, it is possible to obtain a polarizing plate protection film which can restrict the generation of rainbow-like irregularities and produce an excellent quality liquid crystal display device even when a general-purpose film is used as the transparent substrate.

Here, the reason why it becomes possible to prevent the generation of rainbow-like irregularities in the polarizing plate protection film of the present invention, even when a general-purpose film having a large in-plane distribution of an in-plane retardation (Re) is used as the transparent substrate, by providing the refractive index difference-mitigating part is not clear. It is generally assumed to be as follows. The generation of rainbow-like irregularities is assumed to be reduced because the provision of the refractive index difference-mitigating part to the polarizing plate protection film reduces the reflectance difference between a P polarization and S polarization of the light transmitted from the backlight side to the observer side.

However, the above is a mere assumption. Thus, if the film has the same technical structure as that of the polarizing plate protection film of the present invention, even when the generation of rainbow-like irregularities is restricted by a different reason from the above, the film is regarded as being in the technical scope of the present invention.

In the present invention, the in-plane retardation (Re) is described by the following formula which represents the relation of the refractive index (nx) of the largest refractive index direction (slow axis direction) and the refractive index (ny) of the direction orthogonal to the slow axis direction (fast axis direction) in the in-plane of the transparent substrate, and the thickness (d) of the transparent substrate:

$$Re = (nx - ny) \times d.$$

Further, the in-plane retardation (Re) can be measured by KOBRA-WR® manufactured by Oji Scientific Instruments (measuring angle 0°, measuring wavelength 548.2 nm).

The polarizing plate protection film of the present invention comprises at least the transparent substrate and the refractive index difference-mitigating part, and may have other optional constitution(s) as needed.

Hereinafter, each constitution will be explained in detail.

1. Transparent Substrate

First, a transparent substrate used in the present invention will be explained. The transparent substrate used in the present invention has in-plane retardation (Re) of 5 nm or more. The present invention enables to use a transparent substrate having a large in-plane retardation (Re), which had never been possible to use for the liquid crystal display device.

Here, the reason of using the transparent substrate having the in-plane distribution of an in-plane retardation (Re) of the above-mentioned range in the present invention is because the decrease in display quality of the liquid crystal display device caused by the rainbow-like irregularities is less likely to occur when the distribution of an in-plane retardation (Re) of the transparent substrate is smaller than the above-mentioned range. In other words, when a transparent substrate having a smaller in-plane distribution of an in-plane retardation (Re) than the above-mentioned range is used, the decreases in display quality caused by the rainbow-like irregularities is reduced even without providing a refractive index difference-mitigating part unlike the present invention. Further, as explained, the main advantage of the polarizing plate protection film of the present invention is to allow the commercially available general-purpose film or a film produced by a simple method to be used as a transparent substrate. In such films, it is difficult to set the in-plane distribution of the in-plane retardation (Re) to outside the above-mentioned range and pursuit of this requires the specialized technique while eliminating the object of the present invention.

In other words, the polarizing plate protection film of the present invention has the technical significance of being capable of providing an excellent display quality liquid crystal display device even when a transparent substrate having large in-plane distribution of the in-plane retardation (Re) is used. The range of the in-plane distribution of the in-plane retardation (Re) means that it is possible to use a general-purpose film as it is for a transparent substrate of the present invention.

The term "in-plane distribution of the in-plane retardation (Re) value" is defined as the difference between the maximum value and minimum value obtained by measuring the in-plane retardation of 20 points provided with an even gap therebetween for an optional 200 mm width. Further, the in-plane distribution can be calculated from the data obtained by measuring with KOBRA-WR® manufactured by Oji Scientific Instruments (measuring angle 0°, measuring wavelength 548.2 nm).

The transparent substrate used in the present invention has the in-plane distribution of the in-plane retardation (Re) of the above-mentioned range. The in-plane distribution of the in-plane retardation (Re) may be larger than the above-mentioned range because the refractive index difference-mitigating part to be explained later is used in the polarizing plate protection film of the present invention. More specifically, the in-plane distribution of the in-plane retardation (Re) for the present invention may be 10 nm or larger or may be 20 nm or larger. This is because the present invention has the refractive index difference-mitigating part to be explained later and thereby, it becomes possible to obtain a polarizing plate protection film which can restrict the generation of rainbow-like irregularities even if a transparent substrate having such in-plane distribution of retardation (Re) is used.

Further, an in-plane retardation (Re) value of the transparent substrate used in the present invention is not particularly limited. As explained, since the transparent substrate of the present invention has the refractive index difference-mitigating part formed, it is possible to use a transparent substrate having a high in-plane retardation (Re) value, which has been never possible to use for a liquid crystal display device. Accordingly, the in-plane retardation (Re) value of the transparent substrate may be 1300 nm or more, 1400 nm or more, and 1500 nm or more. Since the polarizing plate protection film of the present invention has the refractive index difference-mitigating part to be explained later formed on the transparent substrate, it is possible to obtain a polarizing plate protection film which can produce an excellent quality liquid crystal display device even when such a transparent substrate having a high in-plane retardation (Re) value is used.

Here, in case there is an in-plane distribution in the in-plane retardation (Re) value, it is sufficient if a value at any one of the measuring points of the transparent substrates falls within the above-mentioned range.

The transparent substrate used in the present invention is not particularly limited as long as the in-plane distribution of the in-plane retardation (Re) is within the above-mentioned range, and a transparent substrate made of every material can be used. As examples of the transparent substrate used in the present invention, mention can be made of a polyester-based resins such as polyethylene terephthalate and polyethylene naphthalate, an olefin-based resin such as polyethylene and polymethylpentene, an acrylic-based resin, a polyurethane-based resin, and a resin of polyether sulfone, polycarbonate, polysulfone, polyether, polyether ketone, (meta)acrylonitille, cycloolefin polymer, or cycloolefin copolymer. A transparent substrate made of anyone of the above is suitably used in the present invention. In particular, it is preferable to use a transparent substrate made of polyethylene terephthalate. This is because polyethylene terephthalate has high general-purpose properties and is easily available in the market. Further, as explained, in the present invention, it is possible to obtain a polarizing plate protection film which can produce an excellent quality liquid crystal display device even when a film is made of a material having a very high general-purpose property such as polyethylene terephthalate (PET).

A thickness of the transparent substrate used in the present invention is not particularly limited and is appropriately decided according to factors such as a material constituting the transparent substrate. The thickness of the transparent substrate used in the present invention is generally within the range of 20 μm to 500 μm.

Further, since the polarizing plate protection film of the present invention is used for a liquid crystal display device and the like, a transparent substrate which can transmit the light of visible light range is used as the transparent substrate. In particular, the transparent substrate used in the present invention is preferably a substrate which has a transmission of 80% or higher and more preferably 90% or higher in the visible light range.

Here, a transmission of the transparent substrate can be measured by JIS K 7361-1 (a measuring method of all light transmission for plastic-transparent material).

2. Refractive Index Difference-Mitigating Part

Next, a refractive index difference-mitigating part used in the present invention will be explained. The refractive index difference-mitigating part used in the present invention is formed on the above-mentioned transparent substrate and is provided with a low refractive index layer at its most outer layer, in which the low refractive index layer has a refractive index to a light transmitted through the transparent substrate smaller than a refractive index of the transparent substrate and bigger than a refractive index of air.

Since the polarizing plate protection film of the present invention comprises the refractive index difference-mitigating part provided with a low refractive index layer at its most outer layer, it is possible to prevent the generation of rainbow-like irregularities caused by the in-plane distribution, even when a general-purpose film having a large in-plane retardation (Re) value is used as the transparent substrate. Thereby, it is possible to produce an excellent quality liquid crystal display device.

Hereinafter, such refractive index difference-mitigating part will be explained.

(1) Low Refractive Index Layer

A low refractive index layer used in the present invention will be explained. As explained, the refractive index difference-mitigating part used in the present invention is provided with a low refractive index layer at its most outer layer. Further, the low refractive index layer has a refractive index to a light transmitted through the transparent substrate smaller than that of the transparent substrate and bigger than that of air.

Here, the term "provided with a low refractive index layer at its most outer layer" means that, in case of the refractive index difference-mitigating part used in the present invention has a technical constitution where plural layers are laminated, it is sufficient as long as a low refractive index layer which satisfies the above-mentioned refractive index relation is formed at its most outer layer and no other factors such as a refractive index of other layers are considered. In case of the refractive index difference-mitigating part is formed by a single layer, the low refractive index layer becomes the refractive index difference-mitigating part.

The term "most outer layer" means a layer which is located at the most outer surface of the refractive index difference-mitigating part of the present invention and which contacts to the air.

The low refractive index layer of the present invention is not particularly limited as long as it has a refractive index to a light transmitted through the transparent substrate smaller than that of the transparent substrate and bigger than that of air. The low refractive index layer used in the present invention has a refractive index to a light transmitted through the transparent substrate preferably in the range of 1.1 to 2.0, more preferably in the range of 1.2 to 1.8, and further more preferably in the range of 1.3 to 1.6. Since the refractive index of the low refractive index layer is within the above-mentioned range, a liquid crystal display device produced by using the polarizing plate protection film of the present invention can be made further excellent in its display quality.

The refractive index of the low refractive index layer may be a refractive index which smoothly changes to the refractive index of the air from the transparent substrate side to the air side in the low refractive index layer.

A material used for the low refractive index layer of the present invention is not particularly limited as long as the material can form a low refractive index layer having the above-mentioned refractive index. The material can be appropriately decided in accordance with the specific embodiment of the present invention in which the refractive index difference-mitigating part is formed on the transparent substrate. In particular, a transparent resin is preferable as a resin used for the low refractive index layer. As specific examples, three types of an ionizing radiation cure resin which is cured by a UV ray or electron beam, a thermosetting resin, and a mixture of an ionizing radiation cure resin and a thermosetting resin can be cited. The ionizing radiation cure resin is preferable.

As specific examples of the ionizing radiation cure resin, mention can be made of a resin having an acrylate-based function group such as a polyester resin having a relatively low molecular-weight, a polyether resin, an acrylate resin, an epoxy resin, an urethane resin, an alkyd resin, a spiroacetal resin, a polybutadiene resin, a polythiolpolyene resin; an oligomer or a prepolymer such as (meta) acrylate which is a polyfunctional compound of polyol and the like; and a reactive diluents. As specific examples of these, a monofunctional monomer such as ethyl(meta)acrylate, ethylhexyl(meta)acrylate, styrene, methylstyrene, N-vinylpyrrolidone; and a multifunctional monomer such as polymethylolpropanetri(meta)acrylate, hexanediol(meta)acrylate, tripropylene glycoldi(meta)acrylate, diethylene glycoldi(meta)acrylate, pentaerythritoltri(meta)acrylate, dipentaerythritolhexa(meta)acrylate, 1,6-hexanedioldi(meta)acrylate, and neopentylglycoldi(meta)acrylate. In using such ionizing radiation cure resin as an ultraviolet curing type resin, it is preferable to use a photopolymerization initiator. As a photopolymerization initiator, the followings are cited. In case of a resin having a radically polymerizable unsaturated functional group, substance such as acetophenones, benzophenones, thioxanthones, benzoin, and benzoin methyl ether are used alone or in mixture. In case of a resin having a cationically polymerizable functional group, aromatic diazonium salt, aromatic sulfonium salt, aromatic iodonium salt, a metacelon compound, and benzoin sulfonic ester can be used alone or in mixture. An amount of the photopolymerization initiator added is 0.1 to 10 parts by weight to 100 parts by weights of the ionizing radiation cure resin composition.

Further, as specific examples of the thermosetting resin, mention can be made of a phenolic resin, a urea resin, a diallyl phthalate resin, a melamine resin, a guanamine resin, an unsaturated polyester resin, a polyurethane resin, an epoxy resin, an aminoalkyd resin, a melanine-urea cocondensed resin, a silicon resin, and a polysiloxane resin. In using a thermosetting resin, a curing agent such as a cross-linking agent and a polymerization initiator, a polymerization promoter, a solvent, a viscosity modifier, or the like can be further added as needed.

In the present invention, a silicone-containing copolymer, fluorine-containing copolymer, and fine particles can be added as needed to the above-mentioned ionizing radiation cure resin, thermosetting resin, and a mixture of ionizing radiation cure resin and thermosetting resin in order to adjust a refractive index. As an example of the silicone-containing copolymer, silicone-containing vinylidene copolymer is cited. As an example of the fluorine-containing copolymer, a copolymer obtained by copolymerizing a monomer composition which contains vinylidene fluoride and hexafluoropropylene is cited. As examples of the fine particles, silica fine particles, acrylic fine particles, styrene fine particles, acrylic styrene copolymer fine particles, and fine particles having void are cited. In the present invention, the term "fine particles having void" means fine particles which have a structure where gas is filled in the fine particles and/or a porous structure containing gas, and the fine particles has a refractive index which lowers inversely to the gas portion of the air compare to the refractive index the fine particles originally has.

(2) Refractive Index Difference-Mitigating Part

The refractive index difference-mitigating part used in the present invention is formed on the above-mentioned transparent substrate and has the low refractive index layer at its most outer layer. Thus, the refractive index difference-mitigating part of the present invention may be made of only the low refractive index layer or may have a technical structure where the low refractive index layer and the other layers are laminated.

Further, the refractive index difference-mitigating part used in the present invention is formed on the transparent substrate. An embodiment of the present invention in which the refractive index difference-mitigating part is formed on the transparent substrate may be an embodiment where the refractive index difference-mitigating part is formed on the transparent substrate as a separate and independent layer (first embodiment), or an embodiment where the refractive index difference-mitigating part is formed on the transparent substrate surface so as to unite with the transparent substrate (second embodiment). In the present invention, a refractive index difference-mitigating part of either embodiment is preferably used. In particular, it is preferable to use the refractive index difference-mitigating part of the first embodiment.

The refractive index difference-mitigating part of the first embodiment is not particularly limited as long as the refractive index difference-mitigating part, which has a technical constitution where the low refractive index layer is formed at least the most outer layer, is formed on the transparent substrate separately and independently. As examples of the refractive index difference-mitigating part of the present embodiment, a refractive index difference-mitigating part which has a technical constitution where the part has plural layers of different refractive indexes laminated on the transparent substrate, and a refractive index difference-mitigating part which has a technical constitution where only a low refractive index layer is formed on the transparent substrate can be cited.

Figure 2A:
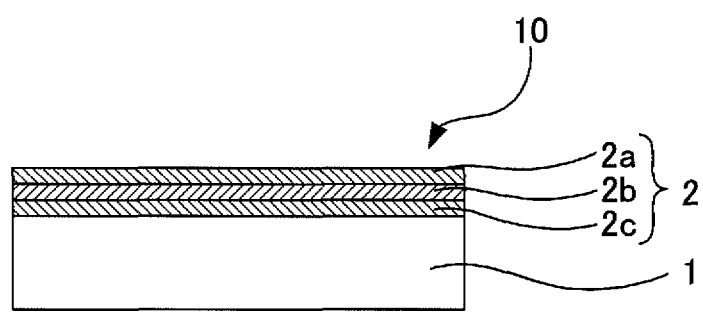
FIGS. 2A and 2B are each a schematic view illustrating other embodiments of the polarizing plate protection film of the present invention.
Figure 2B:
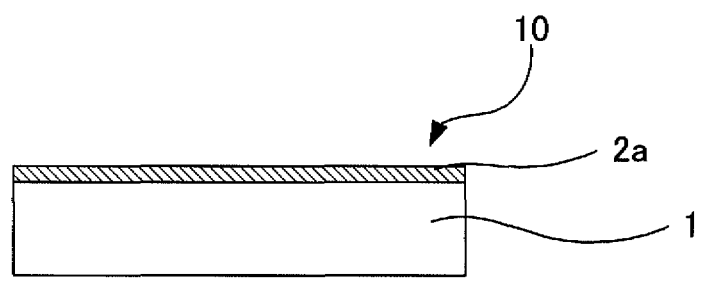

The refractive index difference-mitigating part of the present embodiment will be explained with reference to the drawings. FIGS. 2A and 2B are each a schematic cross-sectional view showing one embodiment of the polarizing plate protection film where a refractive index difference-mitigating part of the embodiment is used. As shown in FIGS. 2A and 2B, as a refractive index difference-mitigating part 2, a polarizing plate protection film 10 of the present invention may have a refractive index difference-mitigating part 2 formed separately and independently on a transparent substrate 1.

Further, as shown in FIGS. 2A and 2B, the refractive index difference-mitigating part 2 may have a technical constitution where plural layers (2a to 2c) are laminated (FIG. 2A), or may have a technical constitution where only the low refractive index layer 2a is formed (FIG. 2B).

The refractive index difference-mitigating part which has a technical constitution where the part has plural layers of different refractive indexes laminated is not particularly limited as long as it has the low refractive index layer at its most outer layer. As such refractive index difference-mitigating part, a refractive index difference-mitigating part where plural layers of different refractive indexes are laminated so as the refractive indexes are lowered in order from the transparent substrate side, and a refractive index difference-mitigating part where a layer having a high refractive index and a layer having a low refractive index are laminated alternatively can be cited. In the present embodiment, a refractive index difference-mitigating part having either of the above technical constitutions is preferably used. In case of the former technical constitution, for example, there are advantages that it is possible to further prevent the generation of rainbow-like irregularities in a liquid crystal display device produced by using the polarizing plate protection film of the present invention and that it is possible to produce a liquid crystal display device having higher display quality by using a general-purpose film. In case of the latter technical constitution, because the refractive index difference-mitigating part also has properties of an antireflection layer which reflects light, there are advantages of not only resolving the generation of rainbow-like irregularities in a liquid crystal display device produced by using the polarizing plate protection film of the present invention, but also of improving the visibility of the displayed image.

In the case of the above-mentioned refractive index difference-mitigating part having a technical constitution where the part has plural layers of different refractive indexes laminated is used, a layer formed at its outer most layer becomes the low refractive index layer which satisfies the above-mentioned refractive index relation. In such a case, the refractive indexes of the layers other than the low refractive index layer are not particularly limited, and a layer which has a higher refractive index than that of the transparent substrate may be used.

As an embodiment where the refractive index difference-mitigating part is formed only by the low refractive index layer, an embodiment which contains hollow silica fine particles as the low refractive index layer can be cited.

The refractive index difference-mitigating part used in the present invention preferably has a reflectance to the light transmitted through the transparent substrate at Brewster's angle of 6% or more. In order to set the reflectance at Brewster's angle to 5% or less, it is sometimes necessary to make the technical constitution of the refractive index difference-mitigating part complex, such as to make it a multiple laminate body or a moth-eye structure. However, if the reflectance at Brewster's angle is targeted to 6% or more, it can be attained with a relatively simple technical constitution. For example, a refractive index difference-mitigating part having a reflectance to the light transmitted through the transparent substrate at Brewster's angle of 6% or more is realized by constituting the refractive index difference-mitigating part only by a low refractive index layer.

Further, the refractive index difference-mitigating part used in the present invention preferably has a difference between a reflectance of P wave and a reflectance of S wave at incident angle of 50 degrees of 20% or less. Thereby, it becomes possible to restrict the generation of rainbow-like irregularities despite the value of Brewster's angle. In particular, the difference between a reflectance of P wave and a reflectance of S wave incident from the transparent substrate side in the present invention is preferably within the above-mentioned range.

Here, the incident angle is made to 50° because the rainbow-like irregularities are likely to be observed in general when a liquid crystal display device is viewed by an angle of 50°.

The refractive index difference-mitigating part of the present invention preferably has a reflectance to the light transmitted through the transparent substrate at Brewster's angle of 6% or more, and the difference between a reflectance of P wave and a reflectance of S wave at incident angle of 50 degrees is preferably 20% or less. As explained above, since the difference between the reflectance of P wave and that of S wave at incident angle of 50 degrees is 20% or less, it becomes possible to restrict the generation of rainbow-like irregularities irrespective of the reflectance at the Brewster's angle. Thereby, using of such refractive index difference-mitigating part enables to produce a polarizing plate protection film by simple processes and to produce the polarizing plate protection film which can restrict the generation of rainbow-like irregularities 3. Polarizing Plate Protection Film The polarizing plate protection film of the present invention has the refractive index difference-mitigating part on the transparent substrate, and thereby, the difference between the reflectance of P wave and the reflectance of S wave at incident angle of 50 degrees is preferably 20% or less as the polarizing plate protection film. Thereby, it becomes possible to restrict the generation of rainbow-like irregularities irrespective of the reflectance of the refractive index difference-mitigating part at the Brewster's angle.

Here, as the polarizing plate protection film, the reflectance means a reflectance obtained by measuring the light incident from the transparent substrate side at incident angle of 50°.

The polarizing plate protection film of the present invention comprises at least the transparent substrate and the refractive index difference-mitigating part, and other optional technical constitution(s) may be used as needed. The optional technical constitution(s) used in the present invention is not particularly limited and any one which can provide the desired function(s) to the polarizing plate protection film can be appropriately selected and used. As an example of such optional technical constitution, a hard coat layer which is formed between the refractive index difference-mitigating part and the transparent substrate is cited. Using of such hard coat layer provides an advantage in improving the strength of the polarizing plate protection film of the present invention.

Figure 3:
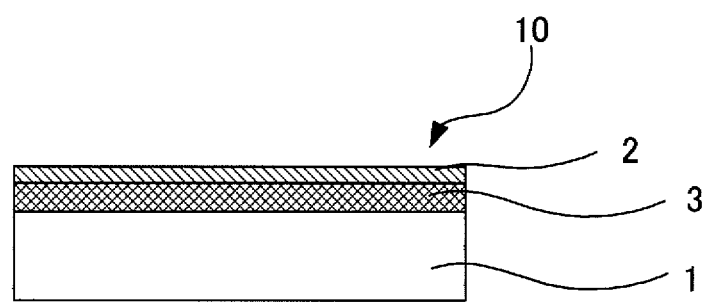
FIG. 3 is a schematic cross-sectional view illustrating another embodiment of the polarizing plate protection film of the present invention.

FIG. 3 is a schematic cross-sectional view illustrating one embodiment of the present invention in which the hard coat layer is formed on the polarizing plate protection film. As shown in FIG. 3, a polarizing plate protection film of the present invention may comprises a transparent substrate 1, a refractive index difference-mitigating part 2, and a hard coat layer 3 formed between the transparent substrate 1 and the refractive index difference-mitigating part 2.

4. Producing Method for Polarizing Plate Protection Film

Next, a producing method of a polarizing plate protection film of the present invention will be explained. The polarizing plate protection film of the invention can be produced by using a transparent substrate and forming the refractive index difference-mitigating part on the transparent substrate surface.

Here, in the present invention, a general-purpose film having a large in-plane distribution of an in-plane retardation (Re) value of the transparent substrate can be also used. Thus, it is possible to produce a polarizing plate protection film of the present invention using a readily-accessible general-purpose film and forming a refractive index difference-mitigating part on the film through a generally-known method.

B. Polarizing Plate

Next, a polarizing plate of the present invention will be explained. The polarizing plate of the invention comprises: a first polarizing plate protection film; a polarizer; and a second polarizing plate protection film, wherein the first polarizing plate protection film further comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more, wherein the polarizer is laminated on the transparent substrate of the first polarizing plate protection film, and wherein the second polarizing plate protection film is laminated on the polarizer.

Figure 4:
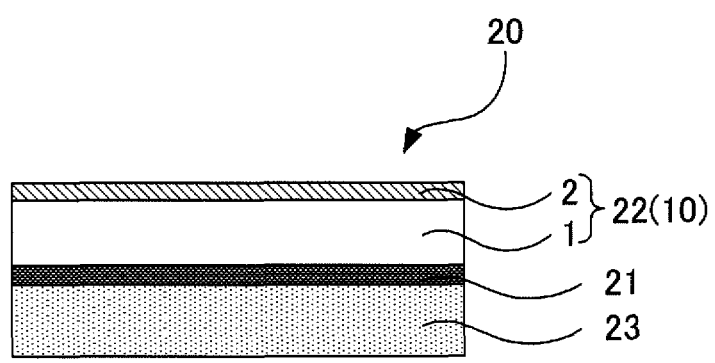
FIG. 4 is a schematic cross-sectional view illustrating one embodiment of the polarizing plate of the present invention.

Such polarizing plate of the present invention will be explained with reference to the drawings. FIG. 4 is a schematic cross-sectional view illustrating one embodiment of the polarizing plate of the present invention. As shown in FIG. 4, a polarizing plate 20 of the present invention comprises a first polarizing plate protection film 22, a polarizer 21 formed on a transparent substrate 1 of the first polarizing plate protection film 22, and a second polarizing plate protection film 23 formed on the polarizer 21.

In such an embodiment, the polarizing plate 20 of the present invention comprises the following polarizing plate protection film of the present invention as a first polarizing plate protection film 10. The polarizing plate protection film comprises the transparent substrate 1, and a refractive index difference-mitigating part 2 formed on the transparent substrate 1 and provided with a low refractive index layer at its most outer layer, in which the low refractive index layer has a refractive index to a light transmitted through the transparent substrate 1 smaller than that of the transparent substrate 1 and bigger than that of air, and an in-plane distribution of an in-plane retardation (Re) of the transparent substrate 1 is 5 nm or more.

In the present invention, a film comprising the transparent substrate and the refractive index difference-mitigating part is used as the first polarizing plate protection film. Thereby, it becomes possible to prevent the generation of rainbow-like irregularities even when a general-purpose film substituting a cellulosic ester film is used as the transparent substrate. Thus, it becomes possible to obtain a polarizer which can produce an excellent quality liquid crystal display device.

The polarizing plate of the present invention comprises at least a first polarizing plate protection film, polarizer, and second polarizing plate protection film, and may further comprise other structure as needed.

Hereinafter, each structure used in the present invention will be explained.

1. First Polarizing Plate Protection Film

First, a first polarizing plate protection film used in the present invention will be explained. The first polarizing plate protection film of the invention comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more.

Here, the first polarizing plate protection film used in the present invention is the same as that explained in the above section "A. Polarizing Plate Protection Film". Thus, explanation here is omitted.

The first polarizing plate protection film of the present invention is used as such that the transparent substrate is to be provided on the polarizer side.

2. Polarizer

Next, a polarizer used in the present invention will be explained. The polarizer of the invention has a function to provide polarization properties to the polarizing plate of the invention.

The polarizer used in the present invention is not particularly limited as long as it has the desired polarization properties. A polarizer generally used for a polarizing plate of a device such as a liquid crystal display device can be used without particular limitation. In the invention, a polarizer generally made of a stretched polyvinyl alcohol film and containing iodine is preferably used.

3. Second Polarizing Plate Protection Film

Next, a second polarizing plate protection film used in the present invention will be explained. The second polarizing plate protection film used in the present invention has functions such as to prevent the polarizer being exposed to the moisture in the air or the like and to prevent the size change in the polarizer.

The second polarizing plate protection film used in the present invention is not particularly limited as long as it can protect the polarizer and has the desired transparency. In particular, the second polarizing plate protection film used in the present invention is preferably a film which has a transmission of 80% or higher and more preferably 90% or higher in the visible light range.

Here, a transmission of the second polarizing plate protection film can be measured by JIS K 7361-1 (a measuring method of all light transmission for plastic-transparent material).

As examples of a material constituting the second polarizing plate protection film used in the present invention, mention can be made of cellulose derivatives, cycloolefin-based derivatives, polymethylmethacrylate, polyvinyl alcohol, polyimide, polyarylate, polyethylene terephthalate, polysulfone, polyetersulfone, amorphouspolyolefin, modified acrylic-based polymer, polystyrene, an epoxy resin, polycarbonate, and polyesters.

Among them, it is preferable in the present invention to use cellulose derivatives or a cycloolefin-based polymer as the resin material.

The cellulose derivatives are not particularly limited as long as the derivatives have the desired factors such as transparency and moisture permeability. In particular, in the present invention, it is preferable to use cellulose ester as the cellulose derivatives. Among the cellulose esters, it is preferable to use cellulose acylates. This is because the cellulose acylates are widely used in the industry and are advantageous for their easy availabilities.

Further, in the present invention, it is preferable to use short-chain fatty acid ester having 2 to 4 carbons among cellulose acylates. Such short-chain fatty acid ester may be, for example, one containing a single short-chain fatty acid ester such as cellulose acetate, or one containing plural fatty acid ester such as cellulose acetate butyrate or cellulose acetate propionate.

In the present invention, cellulose acetate is particularly preferably used among the above-mentioned short-chain fatty acid ester. As cellulose acetate, it is most preferable to use triacetylcellulose having the average acetification degree of 57.5 to 62.5% (substitution degree: 2.6 to 3.0). Here, the acetification degree means the amount of acetic acid bound per cellulose unit mass. The acetification degree can be obtained by measuring and calculating the acetylation degree in ASTM: D-817-91 (testing method of substance such as cellulose acetate).

On the other hand, as the cycloolefin-based polymer used in the present invention is not particularly limited as long as it is a resin which contains a monomer unit made of cyclic olefin (cycloolefin). As examples of such monomer made of cyclic olefin, norbornene and polycyclic norbornene-based monomer are cited.

Here, as the cycloolefin-based polymer used in the present invention, either of cycloolefin polymer (COP) and cycloolefin copolymer (COC) can be suitably used.

The cycloolefin-based polymer used in the present invention may be a homopolymer or copolymer of a monomer made of cyclic olefin.

Further, the cycloolefin-based polymer used in the present invention preferably has a saturated water absorption at 23° C. of 1 mass % or less, and particularly within the range of 0.1 to 0.7 mass %. By using such cycloolefin-based polymer, the retardation film of the present invention can be made one which is less likely to have a change in optical properties or in size caused by water absorption.

Here, the saturated water absorption is obtained by dipping the polymer in water of 23° C. for one week and measuring the increased weight, based on ASTMD 570.

Further, the cycloolefin-based polymer used in the present invention preferably has a glass transition point within the range of 100 to 200° C., more preferably within the range of 100 to 180 t, and particularly preferably within the range of 100 to 150° C. By having the glass transition point of the above-mentioned range, it is possible to make the retardation film used in the present invention having more excellent heat resistance and process suitability.

As specific examples of the polarizing plate protection film made of a cycloolefin-based resin used in the present invention, mention can be made of Topas® manufactured by Ticona GmbH, ARTON® manufactured by JSR Corporation, ZEONOR® manufactured by ZEON CORPORATION, ZEONEX® manufactured by ZEON CORPORATION, and APEL™ manufactured by Mitsui Chemicals, Inc.

The second polarizing plate protection film used in the present invention may be made of a single layer or have a technical structure where plural layers are laminated. Here, the technical structure where plural layers are laminated may be a structure where plural layer of the same composition are laminated or where plural layers of different compositions are laminated.

Further, the second polarizing plate protection film used in the present invention may have refractive index anisotropy and thereby has an optical compensation function. In other words, in the polarizing plate of the present invention, it is possible to use an optical compensation film (retardation film) for a liquid crystal display device as the second polarizing plate protection film. As embodiments where the second polarizing plate protection film used in the present invention has an optical compensation function, an embodiment where a film made of the above-mentioned material contains a compound having refractive index anisotropy, and an embodiment where a layer containing a compound having refractive index anisotropy is formed on the film are cited. Both of the embodiments are suitably used in the present invention, however, in terms of capability in optionally adjusting the refractive index anisotropy in accordance to its application, the latter embodiment is suitably used.

As examples of a compound having the refractive index anisotropy, rodlike compound, a disklike compound, and a liquid crystal compound are cited. Further, since these compounds having the refractive index anisotropy can exhibit excellent optical compensation functions by aligning them regularly, it is preferable to use a compound having a polymerizable functional group from the view point of alignment stability.

4. Polarizing Plate

The polarizing plate of the present invention comprises at least the first polarizing plate protection film, the polarizer, and the second polarizing plate protection film, and may contain other optional constitution(s) as needed. The optional constitution used in the present invention is not particularly limited as long as it does not hinder the function effect of the polarizing plate of the present invention, and any one which can provide the predetermined function(s) to the polarizing plate of the present invention can be used. As an example of such optional constitution, an adhesive layer which is formed between the first polarizing plate protection film and the polarizer, and/or between the second polarizing plate protection film and the polarizer is cited. By forming such adhesive layer, it is possible to improve the adhesive properties between the retardation film and the polarizer in the polarizing plate of the present invention.

As examples of an adhesive used in the adhesive layer, hydrophilic adhesives such as polyvinyl alcohol and polyvinylpyrrolidone, an acrylic pressure sensitive adhesive, urethane-based pressure sensitive adhesive, and an epoxy-based pressure sensitive adhesive are cited.

C. Liquid Crystal Display Device

Next, a liquid crystal display device of the present invention will be explained. The liquid crystal display device of the invention comprises: a liquid crystal cell; a display-side polarizing plate provided to one side of the liquid crystal cell; and a backlight-side polarizing plate provided to the other side of the liquid crystal cell, wherein the display-side polarizing plate further comprises: a first polarizing plate protection film, a polarizer, and a second polarizing plate protection film, wherein the first polarizing plate protection film comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more; the polarizer is laminated on the transparent substrate of the first polarizing plate protection film, and the second polarizing plate protection film is laminated on the polarizer.

Figure 5:
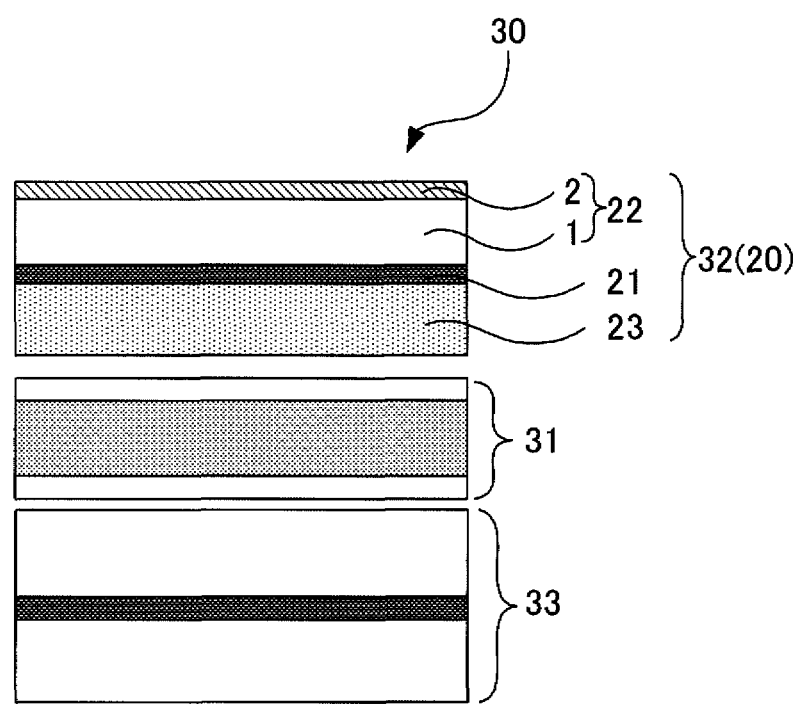
FIG. 5 is a schematic cross-sectional view illustrating one embodiment of the liquid crystal display device of the present invention.

Such liquid crystal display device of the present invention will be explained with reference to the drawings. FIG. 5 is a schematic cross-sectional view illustrating one embodiment of the liquid crystal display device of the present invention. As shown in FIG. 5, a liquid crystal display device 30 of the present invention comprises: a liquid crystal cell 31; a display-side polarizing plate 32 provided to one side of the liquid crystal cell 31; and a backlight-side polarizing plate 33 provided to the other side of the liquid crystal cell 31, wherein the display-side polarizing plate 32 further comprises: a first polarizing plate protection film 22, a polarizer 21, and a second polarizing plate protection film 23, wherein the first polarizing plate protection film 22 comprises a transparent substrate 1, and a refractive index difference-mitigating part 2 formed on the transparent substrate 1 and provided with a low refractive index layer at its most outer layer, in which the low refractive index layer has a refractive index to a light transmitted through the transparent substrate smaller than that of the transparent substrate and bigger than that of air, and an in-plane distribution of an in-plane retardation (Re) of the transparent substrate 1 is 5 nm or more; the polarizer 21 is laminated on the transparent substrate 1 of the first polarizing plate protection film 22, and the second polarizing plate protection film 23 is laminated on the polarizer 21.

In the present invention, a film comprising the transparent substrate and the refractive index-mitigating part is used as the first polarizing plate protection film. Thereby, it becomes possible to prevent the generation of rainbow-like irregularities even when a general-purpose film substituting a cellulosic ester film is used as the transparent substrate. Thus, it becomes possible to obtain an excellent quality liquid crystal display device.

Here, the term "display-side polarizing plate" refers to a polarizing plate provided to a side close to the observer's side from the liquid crystal cell, out of two polarizing plates used for the liquid crystal display device. The term "backlight-side polarizing plate" refers to a polarizing plate provided to a side close to the backlight side from the liquid crystal cell.

The liquid crystal display device of the present invention comprises at least a display-side polarizing plate, liquid crystal cell, and backlight-side polarizing plate, and may further comprises other technical structure as needed.

Hereinafter, each structure used in the present invention will be explained in turn.

1. Display-Side Polarizing Plate

First, a display-side polarizing plate used in the present invention will be explained. The display-side polarizing plate of the invention comprises: a first polarizing plate protection film, a polarizer, and a second polarizing plate protection film, wherein the first polarizing plate protection film comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more; the polarizer is laminated on the transparent substrate of the first polarizing plate protection film, and the second polarizing plate protection film is laminated on the polarizer.

Here, the display-side polarizing plate of the present invention is similar to that explained in the above section "B. Polarizing Plate". Thus, explanation here is omitted.

Further, the display-side polarizing plate of the present invention is arranged such that the refractive index difference-mitigating part contacts to the air, in other words, that the transparent substrate side faces to the liquid crystal cell direction.

2. Liquid Crystal Cell

Next, a liquid crystal cell used in the present invention will be explained. A common liquid crystal cell generally used as the liquid crystal cell for the liquid crystal display device can be used for the liquid crystal cell of the invention. Further, display systems such as TN, STN, VA, IPS, and OCB are known as the liquid crystal cell for liquid crystal display device. A liquid crystal cell of one of the above display systems can be used in the present invention.

3. Backlight-Side Polarizing Plate

Next, a backlight-side polarizing plate used in the present invention will be explained. A common polarizing plate generally used for the liquid crystal display device can be used for the backlight-side polarizing plate of the invention. Such a polarizing plate generally has a technical structure where a polarizer is sandwiched between two polarizing plate protection films. A polarizing plate having such a structure can be preferably used as the backlight-side polarizing plate.

The present invention is not limited to the above-mentioned embodiments. Any modification which has substantially the same structure as these embodiments so as to embody the technical conception recited in the claims of the invention and which produces the same effects and advantages as the embodiments is included in the technical scope of the invention.

EXAMPLES

Next, the present invention is further specifically explained by way of examples.

Example 1

Figure 6:
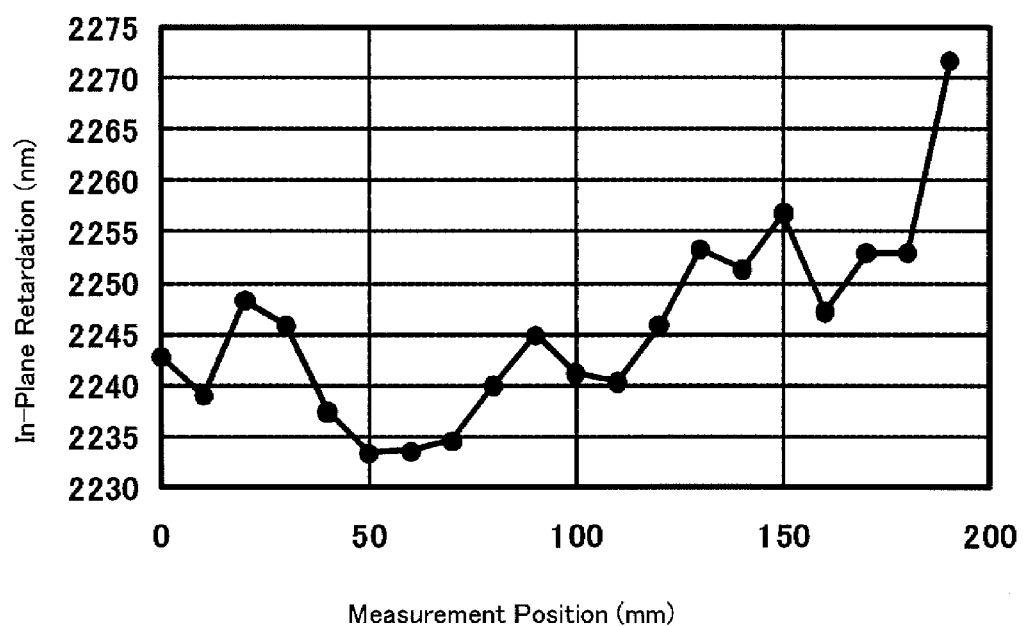
FIG. 6 is a graph showing the in-plane distribution of the in-plane retardation (Re) of the transparent substrate.

A PET film substrate A4300 (product name, manufactured by TOYOBO CO., LTD.) of 125 μm thickness was used as a transparent substrate. Here, the in-plane retardation (Re) of the transparent substrate had a distribution shown in FIG. 6 and its in-plane distribution was 38.2 nm. The in-plane distribution of the in-plane retardation (Re) was evaluated by using KOBRA® (manufactured by Oji Scientific Instruments) and measuring 20 points provided with 1 cm gap therebetween to an optional direction (measuring angle 0°, measuring wavelength 548.2 nm).

Further, a haze of the transparent substrate was 0.6% and all light transmission thereof was 90.1% (measured by HAZEMETER HM-150® manufactured by Murakami Color Research Laboratory).

A hard coat layer forming composition having the following composition was coated on the transparent substrate by bar coating and dried, and the solvent was subsequently removed. Then, the resultant was cured by using an ultraviolet irradiation device (manufactured by Fusion UV Systems Japan KK., light source: H bulb) under a condition of 100 mj/cm$^2$ irradiation amount and a hard coat layer having a refractive index of 1.61 and a thickness of 4 μm was obtained.

| (Hard Coat Layer Forming Composition) | |
|---|---|
| DPHA (product name, manufactured by NIPPON KAYAKU CO., LTD.): | 10.0 parts by weight |
| UV1700B (product name, manufactured by Nippon Synthetic Chemical Industry Co., Ltd.): | 20.0 parts by weight |
| TKS-251 (product name, titania ultrafine particle dispersion liquid manufactured by TAYCA Co., Ltd.): | 10.0 parts by weight |
| IRGACURE 184 (product name, manufactured by Ciba Specialty Chemicals): | 0.5 part by weight |
| methyl ethyl ketone: | 40.0 parts by weight |
| methyl isobutyl ketone: | 40.0 parts by weight |

Next, a low refractive index layer forming composition having the following composition was coated on the hard coat layer by bar coating and dried, and the solvent was subsequently removed. Then, the resultant was cured by using an ultraviolet irradiation device (manufactured by Fusion UV Systems Japan KK., light source: H bulb) under a condition of 100 mj/cm$^2$ irradiation amount and a low refractive index layer having a refractive index of 1.35 and a thickness of 100 nm was obtained.

| (Low Refractive Index Layer Forming Composition) | |
|---|---|
| surface-modified hollow silica fine particle MIBK dispersion liquid (solid content 20% by weight): | 14.0 parts by weight |
| Opstar JN35 (product name, fluorine atom-containing polymer manufactured by JSR Corporation, solid content 15% by weight, solvent MIBK, refractive index 1.41): | 10.0 parts by weight |
| LINC3A (product name, fluorine atom-containing monomer manufactured by Kyoeisha Chemical Co., Ltd., solid content 20% by weight, Solvent MIBK, refractive index 1.42): | 1.0 part by weight |
| pentaerythritoltriacrylate (solid content 100% by weight): | 0.8 part by weight |
| IRGACURE 184 (product name, manufactured by Ciba Specialty Chemicals): | 0.2 part by weight |
| MIBK: | 55.0 parts by weight |
| PGME: | 19.0 parts by weight |

The above-mentioned surface-modified hollow silica fine particle dispersion liquid was prepared by the following method.

First, a solvent substitution of an isopropanol dispersion liquid of hollow silica fine particles manufactured by Catalysts and Chemicals Ltd. as the hollow particle was conducted using a rotatory evaporator from isopropyl alcohol to methyl isobutyl ketone (hereinafter, may referred to MIBK), and a dispersion liquid of 20% by weight silica fine particles was obtained. Next, 3-methacryloxypropylmethyldimethoxy silane of 5% by weight is added to the methyl isobutyl ketone dispersion liquid of 100% by weight and heat treated at 50° C. for 1 hour. Thus, a MIBK dispersion liquid of 20% by weight surface-treated hollow silica fine particles was obtained.

Thereby, a polarizing plate protection film comprising the transparent substrate, a hard coat layer, and a refractive index difference-mitigating part made only by a low refractive index layer, in which the hard coat layer and the refractive index difference-mitigating part are formed on the transparent substrate, was obtained. Thus produced polarizing plate protection film had the haze of 0.4 and its all light-transmission was 95.3% (measured by HAZEMETER HM-150® manufactured by Murakami Color Research Laboratory).

Comparative Example

A PET film substrate A4300 (product name, manufactured by TOYOBO CO., LTD.) of 125 μm thickness was used at it is for a polarizing plate protection film.

(Evaluation 1)

The respective polarizing plate protection films obtained in the Example and Comparative Example were provided on the outer most surface of e liquid crystal TV (LC-26 GH4®, manufactured by SHARP CORPORATION) in such a manner that their refractive index difference-mitigating parts faced to the observers' side. The TV was observed by five people (A, B, C, D, and E) from front and oblique (about 50°) directions and the rainbow-like irregularities were evaluated.

The evaluation results are shown in Table 1. In Table 1, "○" was marked if no rainbow-like irregularities were observed and "x" was marked if rainbow-like irregularities were observed.

As shown in Table 1, no rainbow-like irregularities were observed in the film produced in the Example according to the observation by 5 people.

(Evaluation 2)

Using the reflectance measuring device (V7100 type VAR-7010™ manufactured by JASCO Corporation), regular reflectance measurement of the P polarization and S polarization at incident angles 0 to 65 degrees of the respective polarizing plate protection films obtained in the Example and the Comparative Example was carried out. Then, comparison of refractive index differences between the P polarization and S polarization was carried out. The transparent substrate side of the films obtained in the Example was provided to the light source side and evaluated (see FIG. 8).

Figure 7:
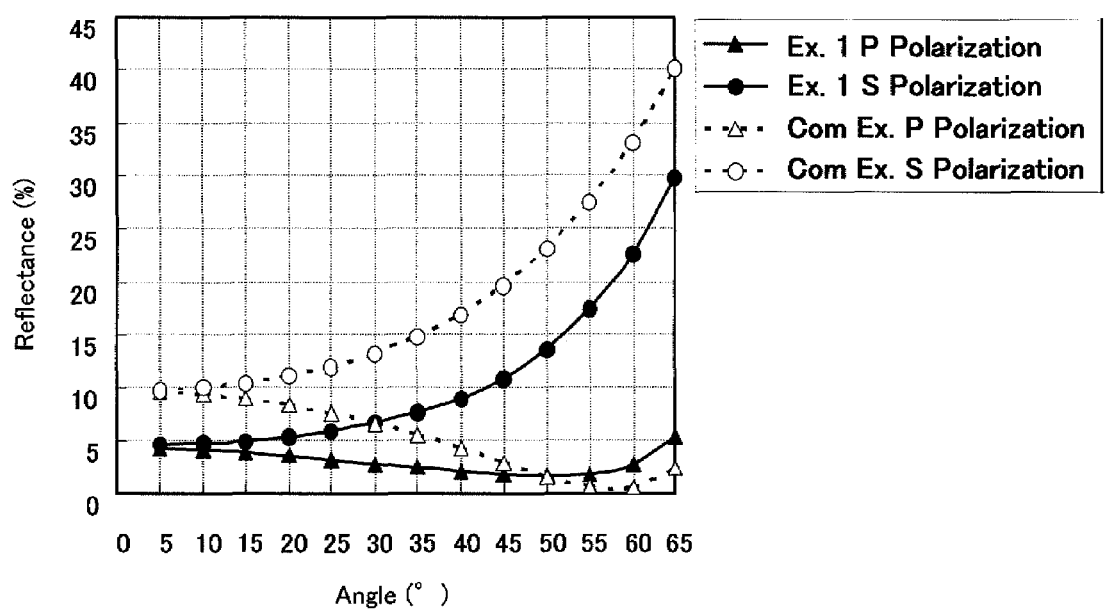
FIG. 7 is a graph showing the regular reflectance measuring results of the P polarization and S polarization.

The results are shown in FIG. 7. As shown in FIG. 7, it was confirmed that the polarizing plate protection film obtained in the Example had the smaller refractive index difference between the P polarization and S polarization compare to that of the polarizing plate protection film obtained in the Comparative Example.
(Evaluation 3)

Figure 10:
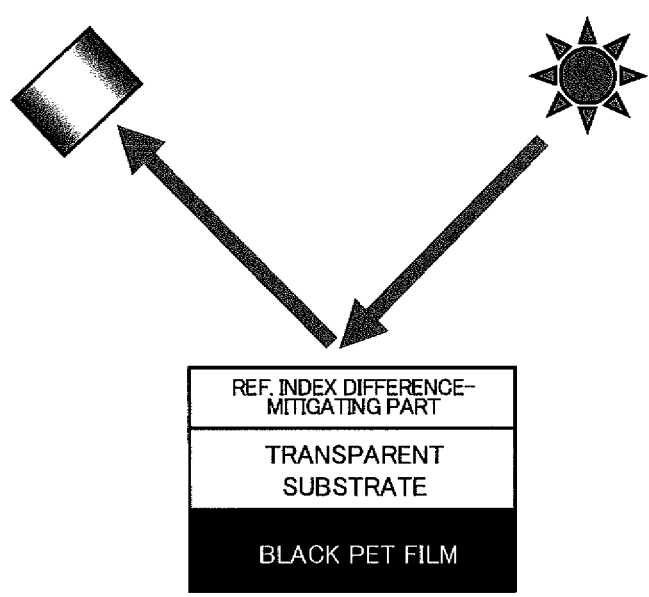
FIG. 10 is a schematic view explaining the measuring method of the reflectance of the refractive index difference-mitigating part at Brewster's angle.
Figure 11:
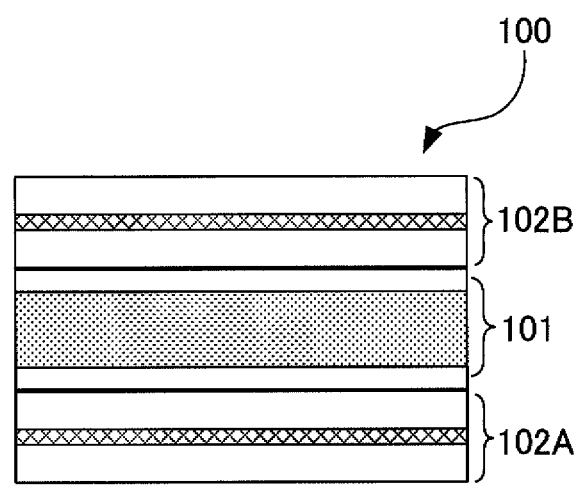
FIG. 11 is a schematic cross-sectional view illustrating one embodiment of a general liquid crystal display device.

The respective reflectance at Brewster's angle of the refractive index difference-mitigating parts was evaluated as shown in FIG. 10. As a result, the Brewster's angle was 53.5° and the reflectance was 2.6%. As a black PET film illustrated in FIG. 10, a film having a product name "Kukkiri Mieru (transliteration)" (manufactured by Tomoegawa Co., Ltd) was used.

Example 2

Using the same transparent substrate as in Example 1, a low refractive index layer forming composition having the following composition was coated on the transparent substrate by bar coating and dried, and the solvent was subsequently removed. Then, the resultant was cured by using an ultraviolet irradiation device (manufactured by Fusion UV Systems Japan KK., light source: H bulb) under a condition of 100 mj/cm$^2$ irradiation amount and a low refractive index layer having a refractive index of 1.51 and a thickness of 2 μm was formed. Thereby a polarizing plate protection film was obtained. The haze of the produced polarizing plate protection film was 8.9% and the all light transmission was 90.8%, and further, the anti-glare effect was confirmed.

| (low refractive index layer forming composition) | |
|---|---|
| pentaerythritoltriacrylate (solid content 100%, refractive index 1.51): | 30.0 parts by weight |
| translucent silica fine particles (average particle diameter 1.2 μm): | 2.5 parts by weight |
| IRGACURE 184 (product name, manufactured by Ciba Specialty Chemicals): | 0.5 part by weight |

| -continued | |
|---|---|
| (low refractive index layer forming composition) | |
| toluene: | 52.0 parts by weight |
| MIBK: | 15.0 parts by weight |

As examples of the translucent silica fine particles, silica beads and amorphous silica are cited. The average particle diameter means the particle diameter of particles presented the most and confirmed by the particle size distribution measurement. The particle size distribution can be measured by a Coulter counter method and a laser diffractometry.
(Evaluation 1)

The rainbow-like irregularities evaluation was carried in the same manner as in Example 1. The results are shown in Table 1. Similar to Example 1, in table 1, "○" was marked if no rainbow-like irregularities were observed and "x" was marked if rainbow-like irregularities were observed.
(Evaluation 2)

Figure 8:
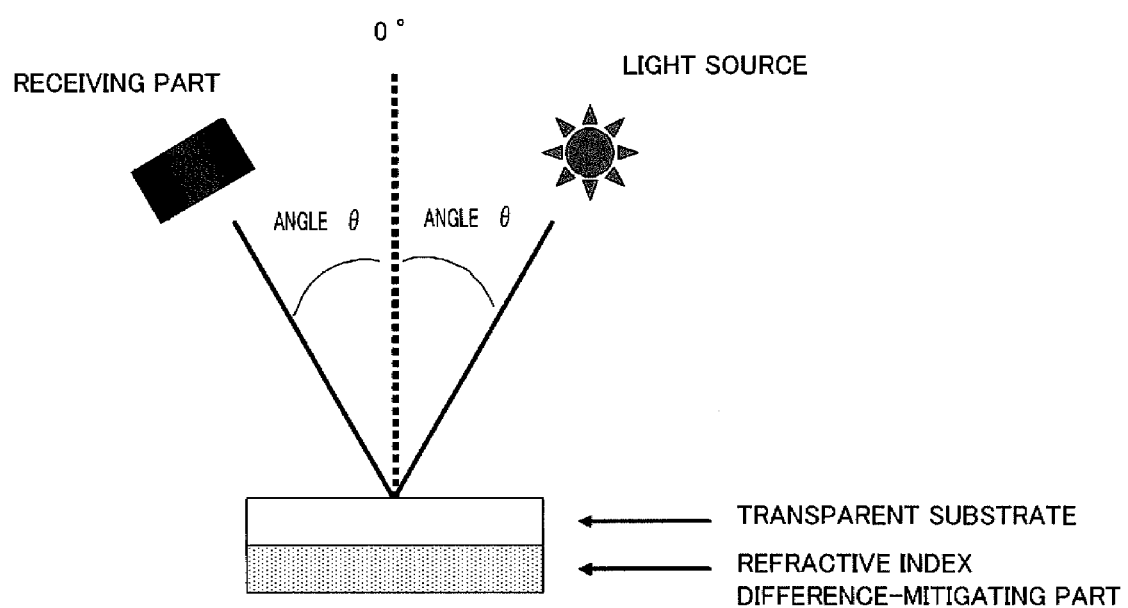
FIG. 8 is a schematic view explaining the measuring method of the regular reflectance of the P polarization and S polarization.
Figure 9:
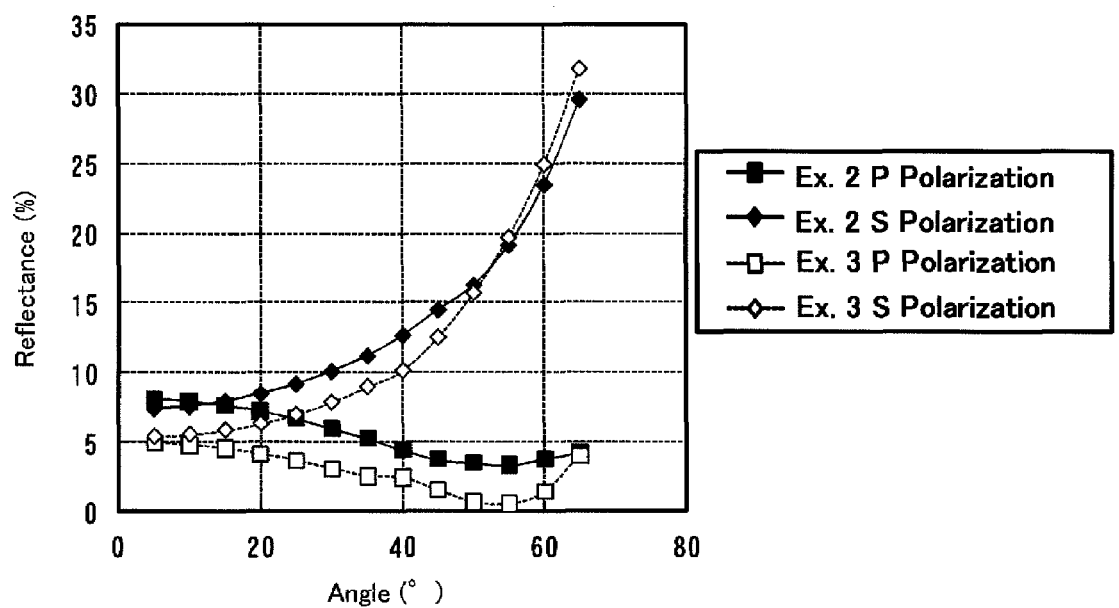
FIG. 9 is a graph showing the regular reflectance measuring results of the P polarization and S polarization.

Using the reflectance measuring device (V7100 type VAR-7010™ manufactured by JASCO Corporation), regular reflectance measurement of the P polarization and S polarization at incident angles 0 to 65 degrees of the polarizing plate protection film obtained in the Example 2 was carried out. Then, comparison of refractive index differences between the P polarization and S polarization was carried out. At that time, the measurement was carried out in a manner as illustrated in FIG. 8. The results are shown in FIG. 9.
(Evaluation 3)

The reflectance at Brewster's angle of the refractive index difference-mitigating part was observed in the same manner as in Example 1. As a result, the Brewster's angle was 56° and the reflectance was 7.0%.

Example 3

A hard coat layer was formed on the transparent substrate by the same manner as in Example 1. Then, a low refractive index layer forming composition having the following composition was coated on the hard coat layer by bar coating and dried, and the solvent was subsequently removed. Then, the resultant was cured by using an ultraviolet irradiation device (manufactured by Fusion UV Systems Japan KK., light source: H bulb) under a condition of 100 mj/cm$^2$ irradiation amount and a low refractive index layer having a refractive index of 1.39 and a thickness of 100 nm was formed. Thereby a polarizing plate protection film was obtained. The haze of the produced polarizing plate protection film was 0.6% and the all light transmission was 93.0%.

| (low refractive index layer forming composition) | |
|---|---|
| surface-modified hollow silica fine particle MIBK dispersion liquid (solid content 20% by weight): | 11.0 parts by weight |
| Opstar JN35 (product name, fluorine atom-containing polymer manufactured by JSR Corporation, solid content 15% by weight, solvent MIBK, refractive index 1.41): | 10.0 parts by weight |
| LINC3A (product name, fluorine atom-containing monomer manufactured by Kyoeisha Chemical Co., Ltd., solid content 20% by weight, Solvent MIBK, refractive index 1.42): | 2.0 parts by weight |
| pentaerythritoltriacrylate (solid content 100% by weight): | 2.8 parts by weight |
| IRGACURE 184 (product name, manufactured by Ciba Specialty Chemicals): | 0.2 part by weight |
| MIBK: | 55.0 parts by weight |
| PGME: | 19.0 parts by weight |

(Evaluation 1)

The rainbow-like irregularities evaluation was carried out in the same manner as in Example 1. The results are shown in Table 1. Similar to Example 1, in Table 1, "○" was marked if no rainbow-like irregularities were observed and "x" was marked if rainbow-like irregularities were observed. Here, although it was slightly weak compare to the result obtained in Example 1, the rainbow-like irregularities preventing effect was also observed in Example 3. Further, in Example 3, color change viewed from the oblique direction was less and better compare to that obtained in Example 1.

(Evaluation 2)

Comparison of refractive index difference between the P polarization and S polarization was carried out in the same manner as in Example 2. The results are shown in FIG. 9.

(Evaluation 3)

The reflectance at Brewster's angle of the refractive index difference-mitigating part was observed in the same manner as in Example 1. As a result, the Brewster's angle was 54° and the reflectance was 4.8%.

TABLE 1

|  |  | Evaluating Person | | | | |
| --- | --- | --- | --- | --- | --- | --- |
|  |  | A | B | C | D | E |
| Example 1 | Front | ○ | ○ | ○ | ○ | ○ |
|  | Oblique | ○ | ○ | ○ | ○ | ○ |
| Example 2 | Front | ○ | ○ | ○ | ○ | ○ |
|  | Oblique | ○ | ○ | ○ | ○ | ○ |
| Example 3 | Front | ○ | ○ | ○ | ○ | ○ |
|  | Oblique | ○ | ○ | ○ | ○ | ○ |
| Comparative | Front | ○ | ○ | ○ | ○ | ○ |
| Example | Oblique | X | X | X | X | X |

What is clamed is:

1. A polarizing plate protection film comprising:
a transparent substrate; and
a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air,
wherein an in-plane distribution of an in-plane retardation (Re) of the transparent substrate is 5 nm or more, and
wherein a difference between a reflectance of P wave and a reflectance of S wave at incident angle of 50 degrees is 20% or less.

2. A polarizing plate protection film comprising:
a transparent substrate; and
a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air,
wherein an in-plane distribution of an in-plane retardation (Re) of the transparent substrate is 5 nm or more, and
wherein the refractive index difference-mitigating part has a reflectance to the light transmitted through the transparent substrate at Brewster's angle of 6% or more, and wherein a difference between a reflectance of P wave and a reflectance of S wave at incident angle of 50 degrees is 20% or less as the polarizing plate protection film.

3. The polarizing plate protection film according to claim 1, wherein the refractive index difference-mitigating part is formed only by the low refractive index layer.

4. The polarizing plate protection film according to claim 1, wherein a value of the in-plane retardation (Re) of the transparent substrate is 1300 nm or more.

5. The polarizing plate protection film according to claim 1, wherein the transparent substrate is made of polyethylene terephthalate (PET).

6. A polarizing plate comprising:
a first polarizing plate protection film;
a polarizer; and
a second polarizing plate protection film,
wherein the first polarizing plate protection film further comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more,
wherein the polarizer is laminated on the transparent substrate of the first polarizing plate protection film,
wherein the second polarizing plate protection film is laminated on the polarizer, and
wherein the first polarizing plate protection film is a film wherein a difference between a reflectance of P wave and a reflectance of S wave at incident angle of 50 degrees is 20% or less.

7. A liquid crystal display device comprising:
a liquid crystal cell;
a display-side polarizing plate provided to one side of the liquid crystal cell; and
a backlight-side polarizing plate provided to the other side of the liquid crystal cell,
wherein the display-side polarizing plate further comprises: a first polarizing plate protection film, a polarizer, and a second polarizing plate protection film,
wherein the first polarizing plate protection film comprises a transparent substrate, and a refractive index difference-mitigating part formed on the transparent substrate and provided with a low refractive index layer at its most outer layer, in which the low refractive index layer has a refractive index to a light transmitted through the transparent substrate smaller than a refractive index of the transparent substrate and bigger than a refractive index of air, and an in-plane distribution of an in-plane retardation (Re) of the transparent substrate is 5 nm or more; the polarizer is laminated on the transparent substrate of the first polarizing plate protection film, the second polarizing plate protection film is laminated on the polarizer, and the first polarizing plate protection film is a film wherein a difference between a reflectance of P wave and a reflectance of S wave at incident angle of 50 degrees is 20% or less.

8. The polarizing plate protection film according to claim 2, wherein the refractive index difference-mitigating part is formed only by the low refractive index layer.

9. The polarizing plate protection film according to claim 2, wherein a value of the in-plane retardation (Re) of the transparent substrate is 1300 nm or more.

10. The polarizing plate protection film according to claim 2, wherein the transparent substrate is made of polyethylene terephthalate (PET).

* * * * *